Feb. 7, 1928.
W. A. RICHARDSON ET AL
1,658,654
TRUCK DRIVE
Filed Feb. 4, 1927 2 Sheets-Sheet 1
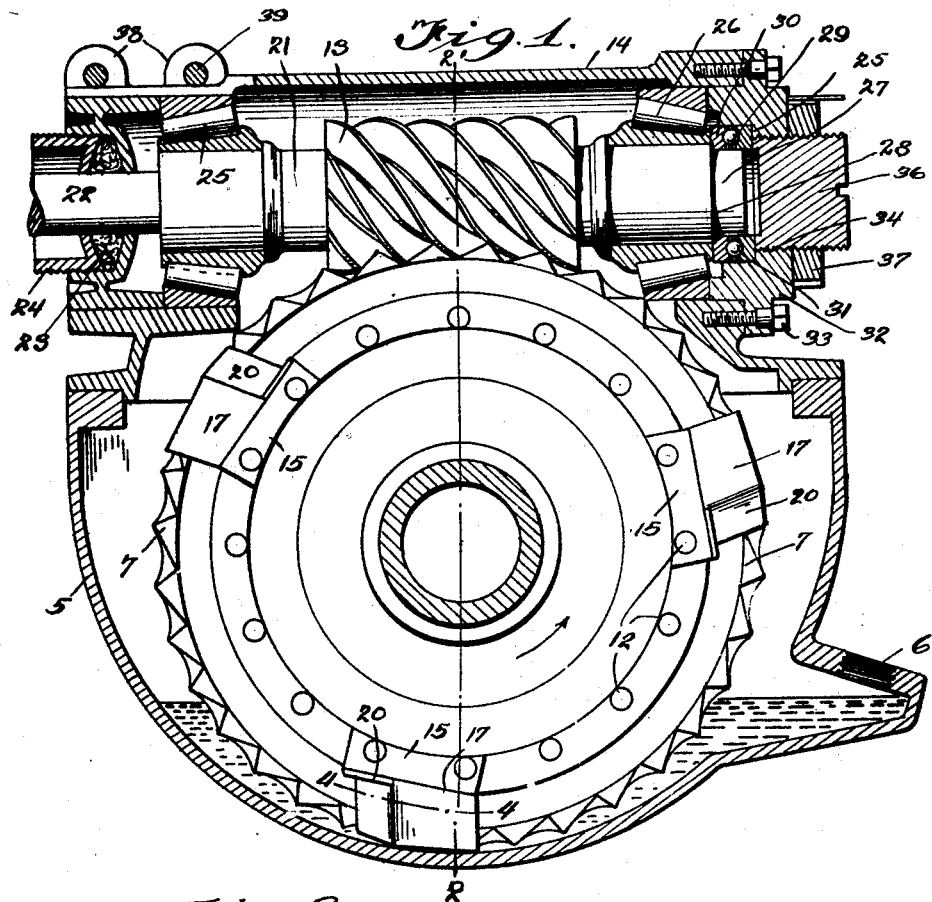
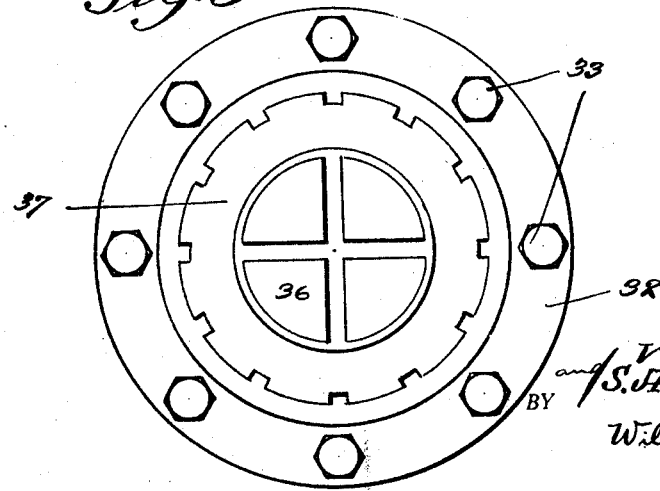
INVENTORS
W. A. Richardson
and S. H. Theard
BY
Wilkinson & Huerta
ATTORNEYS.

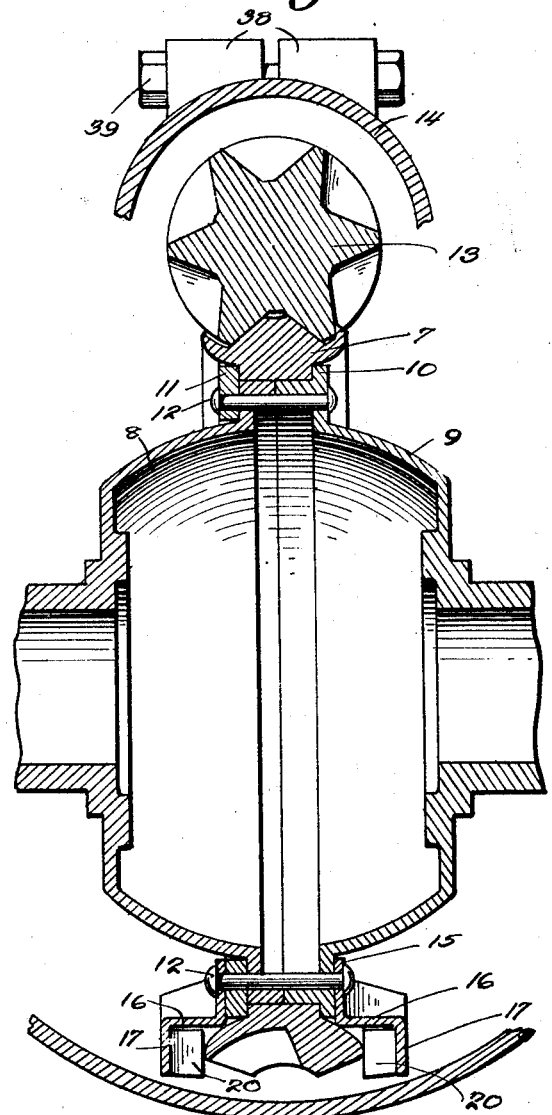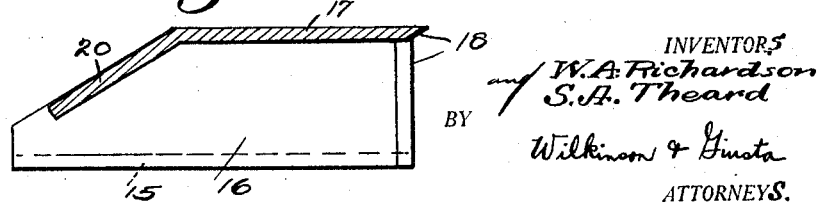

Patented Feb. 7, 1928.

1,658,654

UNITED STATES PATENT OFFICE.

WILLIAM ARTHUR RICHARDSON AND STEPHEN ANDERSON THEARD, OF BATON ROUGE, LOUISIANA.

TRUCK DRIVE.

Application filed February 4, 1927. Serial No. 165,961.

The present invention relates to improvements in truck drives and has for an object to provide certain improvements in the differential construction of motor trucks in which adequate provision is made for taking care not only of the radial, but also of the end thrust of the worm, while admitting of adjustment, for compensating for wear, externally of the differential housing.

Another object of the invention is to provide an improved truck drive wherein complete and faithful lubrication of the worm wheel, worm and radial and end thrust bearings will be had without regard to the slow or fast speed of the vehicle.

In general, objects of the invention are to obviate the present trouble and expense occasioned by the breaking down of differentials due to lack of lubrication; to reduce the friction in the differential to a minimum through the functioning of a ball thrust bearing at the end of the worm shaft; to provide improved grease splashers; and to provide for proper adjustment at all times of the worm and ring gear.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical section taken through a differential housing and showing an improved drive according to the present invention;

Figure 2 is a vertical cross section taken on the line 2—2 in Figure 1;

Figure 3 is an end view of the adjusting mechanism taken on an enlarged scale; and Figure 4 is a longitudinal section of one of the grease splashers, taken on the line 4—4 in Figure 1.

Referring more particularly to the drawings, 5 designates the differential housing having the oil filling opening 6 and containing the ring gear 7 rotating in the direction indicated by the arrow in Figure 1 through the oil contained in the sump up to the level indicated by the broken line also in Figure 1. As shown in Figure 2, the ring gear 7 is clamped to the differential case sides 8 and 9 by the flange 10 at one side, and the ring 11 at the opposite side. Rivets 12 are employed to hold the ring 11 and the two case sides together upon the ring gear 7. The ring gear is adapted to mesh with the worm 13 and during its rotation to carry grease upwardly from the sump to the worm and to the parts in the worm casing 14. These grease splashers are preferably three in number, as indicated in Figure 1 and they are distributed at 120 degrees apart about the circumference of the worm wheel or ring gear. Each splasher is composed of two members, as shown in Figure 2. Each member is formed with an attaching web 15 adapted to lie alongside the flange 10 or ring 11 respectively, and positioned to be received and held by the rivets 12. Preferably two rivets will suffice for this purpose, as indicated in Figure 1. The webs are provided at their outer circumferential edge portions with the base members 16, forming the bottoms of the buckets or troughs of the grease splashers. These bottoms extend at substantially right angles to the webs 15 and outwardly from the ring gear 7. At the outer edges of the bottoms 11 there are the flanges 17 extending substantially parallel with the webs 15. The forward or leading edges of the base 16 and flanges 17 are beveled or sharpened, as indicated at 18 in Figure 4, whereby to facilitate the passage through the grease and the entrance of the grease to the buckets or splashers. The rear portions of the buckets or splashers are partially closed by the inwardly bent diagonal rear walls 20. These walls are continuations of the flanges 17 and they are bent inwardly and rearwardly with respect to the direction of rotation. The free ends of the walls 20 terminate approximately at the sides of the ring gear 7 whereby to hold the grease during the rotation of the ring gear. As shown in Figure 2, the complemental formation of the buckets or splashers at opposite sides of the ring gear act to form a continuous trough transversely of the ring gear. The outer portion of this trough extends beyond the perimeter of the ring gear and thus a supply of grease sufficient to flood the teeth of the ring gear, is held in the troughs.

The worm 13 is mounted on the worm shaft 21 to which is connected the propeller shaft 22, extending through the front portion of the worm housing 14 and lying through the stuffing box 23 having an adjustable gland 24. The forward end of the worm shaft 21 is set in roller tapered bearings 25. The rear end of this same worm shaft is mounted in tapered roller bearings 26, but in accordance with the invention these latter bearings are set forwardly of the position now usually occupied by such bearings. This enables us to turn down the rear end 27 of the worm shaft to a small diameter forming a shoulder 28. Roller bearings 29 comprising the race members 30 and 31 are mounted in engagement with the reduced shaft end 27 and they act against the shoulder 28 to form end thrust bearings. These bearings are confined by the head 32 bolted or otherwise secured to the worm housing 14, as by the bolts 33. The head 32 is provided with a reduced threaded opening 34 and with a shoulder 35 taking against the race member 31. An adjusting plug 36 is fitted adjustably into the threaded opening 34 and takes against the inner portion of the race member 31. By turning this plug in one direction, the thrust member and worm shaft may be pushed forwardly in the casing, and the wear taken up upon the roller and ball bearings. A lock nut 37 is threaded upon the plug 36 and is fixed in place in any appropriate manner.

The forward portion of the worm housing 14 is provided with eyes 38 through which the bolts 39 are passed, whereby to lock the adjustment of the front bearing on the worm shaft.

In the use of the invention, the worm and worm wheel being driven in the usual manner will cause lubrication of both the ring gear and worm wheel by virtue of the rotating of the splashers. This rotation will also cause the splashers to throw the grease into the channels of the worm housing, whereby such grease is conveyed to the tapered roller bearings 25 and 26 and to the thrust roller bearings 29. These several bearings take up not only the radial, but also the end thrust of the worm shaft. The combination of the ball thrust bearing and adjusting plug gives more tractive effort or pulling power, with a lower consumption of gasoline and lubricants. The arrangement also dispenses with the differential trouble experienced in trucks engaged in heavy work where a speed of two or three miles per hour is not uncommon. Where such slow speeds are used, it is very difficult to secure proper lubrication of the parts. However, the grease splashers, without regard to the speed of rotation, will carry the grease into a position to flood the teeth of the ring gear and worm and to splash sufficient grease to the bearings.

It will be apparent that so long as the adjustment of the bearings is preserved, the bearings will be less subject to heating and the disastrous effects of friction. Broken bearings oftentimes result in broken ring gears and worms, and this resulting trouble is dispensed with where the bearings can always be kept in tight position. We are enabled with our external adjusting plug to take up the wear more easily and more frequently than is possible where the differential housing must be first torn down.

It will be obvious that many changes in the construction, combination and arrangement of parts could be made, which could be used without departing from the spirit of our invention, and we do not mean to limit the invention to such details, except as particularly pointed out in the claims.

Having thus described our invention, what we claim and desire to secure by Letters Patent of the United States is:—

1. In a truck drive, a worm wheel, a worm meshing therewith, a worm shaft, a housing about the worm and wheel, roller bearings supporting said worm shaft, said worm shaft having a reduced and shouldered rear end beyond the rear roller bearings, a ball thrust bearing unit fitted upon the reduced shaft end and against said shoulder, a removable head attached to said casing and engaging both the circumferential portion and the outer end portion of said ball thrust bearing unit, and adjusting means carried by said head for also engaging against the ball thrust unit.

2. In a vehicle drive, a worm wheel, a worm meshing with said worm wheel, a worm shaft carrying the worm, a casing for the worm shaft, tapered roller bearing units in the casing for supporting the worm shaft, the rear tapered roller bearing unit being set forwardly of the end portion of said casing, said shaft having a reduced rear end with an adjoining shoulder projecting rearwardly beyond the tapered roller bearing unit, a ball thrust unit located on said reduced shaft end and against said shoulder, a head removably carried by the rear end of said casing engaging the roller bearing unit and having a reduced and shouldered portion forming a counterpart of the reduced and shouldered end portion of the shaft for fitting against the outer circumferential portion and rear end of the thrust bearing unit, a plug adjustably carried by said head and also engaging the rear end of said ball thrust unit, and means for locking said plug in adjusted position.

WILLIAM ARTHUR RICHARDSON.
STEPHEN ANDERSON THEARD.